United States Patent [19]

Dennis

[11] Patent Number: 5,291,465
[45] Date of Patent: Mar. 1, 1994

[54] AUTOMATIC CHANGER FOR DIGITAL DISCS

[76] Inventor: James T. Dennis, 2312 NW. 57th St., Oklahoma City, Okla. 73112

[21] Appl. No.: 518,475

[22] Filed: May 9, 1990

[51] Int. Cl.⁵ .......................................... G11B 17/028
[52] U.S. Cl. ........................ 369/37; 369/34; 369/191; 369/206
[58] Field of Search ...................... 369/34, 35, 36, 37, 369/38, 39, 202, 206, 191, 207; 360/92

[56] References Cited

U.S. PATENT DOCUMENTS

| | | | |
|---|---|---|---|
| 2,274,921 | 3/1942 | Filben | 369/39 |
| 2,339,062 | 1/1944 | Davis et al. | 369/39 |
| 2,557,645 | 6/1951 | Fox | 369/36 |
| 2,670,211 | 2/1954 | Freimann et al. | 369/38 |
| 2,960,340 | 11/1960 | Seidel et al. | 369/34 |
| 3,009,705 | 11/1961 | Foelkel et al. | 369/34 |
| 3,097,850 | 7/1963 | Curci | 369/38 |
| 3,264,003 | 8/1966 | Thevenaz | 369/191 |
| 3,886,591 | 5/1975 | Bettini | 360/92 |
| 4,071,857 | 1/1978 | Whitney et al. | 360/92 |
| 4,099,209 | 7/1978 | Sander et al. | 360/92 |
| 4,447,836 | 5/1984 | Flygstad et al. | 360/92 X |
| 4,594,042 | 6/1986 | Hoffman | 360/92 X |
| 4,755,978 | 7/1988 | Takizawa et al. | 369/37 |
| 4,779,151 | 10/1988 | Lind et al. | 360/92 |
| 4,815,055 | 3/1989 | Fago, Jr. | 369/36 |
| 4,815,056 | 3/1989 | Toi et al. | 369/36 |
| 4,817,070 | 3/1989 | Hug et al. | 369/36 |
| 4,817,071 | 3/1989 | Carlson et al. | 369/36 |
| 4,827,463 | 5/1989 | Motoyoshi et al. | 369/36 |
| 4,903,152 | 2/1990 | Matsui | 360/92 |
| 4,903,154 | 2/1990 | Costas et al. | 360/92 X |

Primary Examiner—Stuart S. Levy
Assistant Examiner—Paul J. Ditmyer
Attorney, Agent, or Firm—Mason, Kolehmainen, Rathburn & Wyss

[57] ABSTRACT

An automatic changer for playing digital discs containing music or other digitally encoded information has a loading station, a play station and a discard station. A robot arm individually engages the top disc of a stack of discs stacked at the loading station through the center hole in the disc and lifts and transports the disc to the play station where it lowers the disc over a reading head for play. After play, the robot arm raises the disc from the play station and transports the disc to the discard station and releases it there. In an alternative embodiment, a carousel containing a plurality of discs rotates sequentially to position the discs over the reading head. When changing discs the carousel is lifted to raise a played disc from the reading head, rotated to position the next disc to be played over the reading head and lowered to lower the disc to be played into playing position.

54 Claims, 6 Drawing Sheets

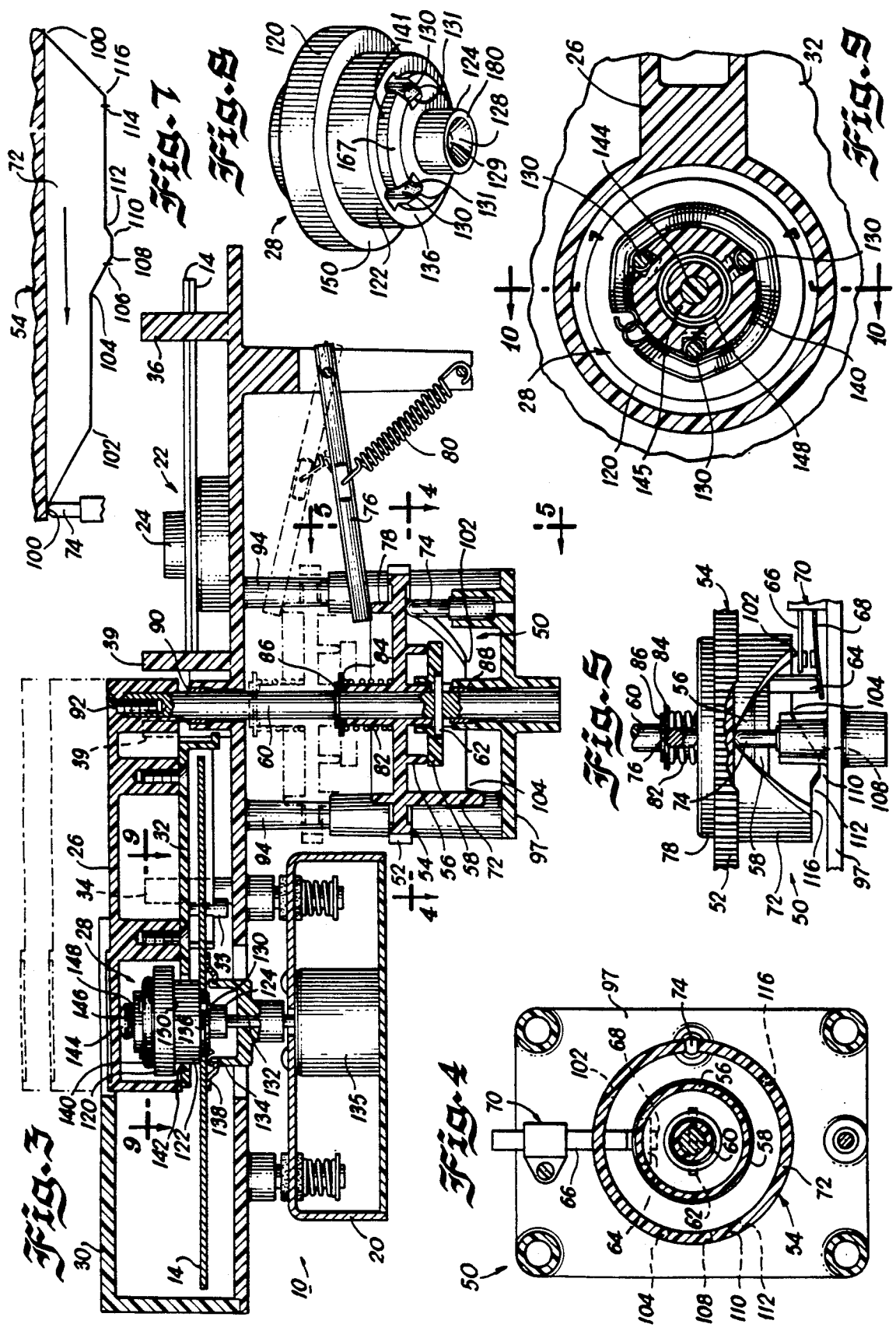

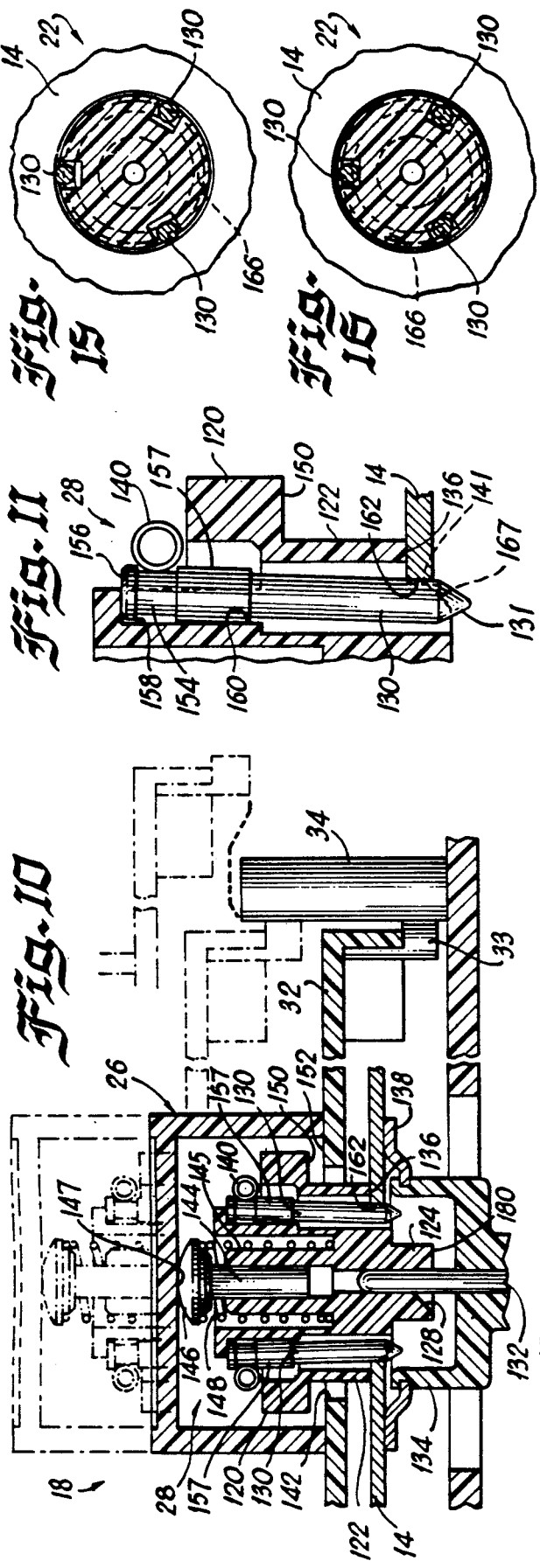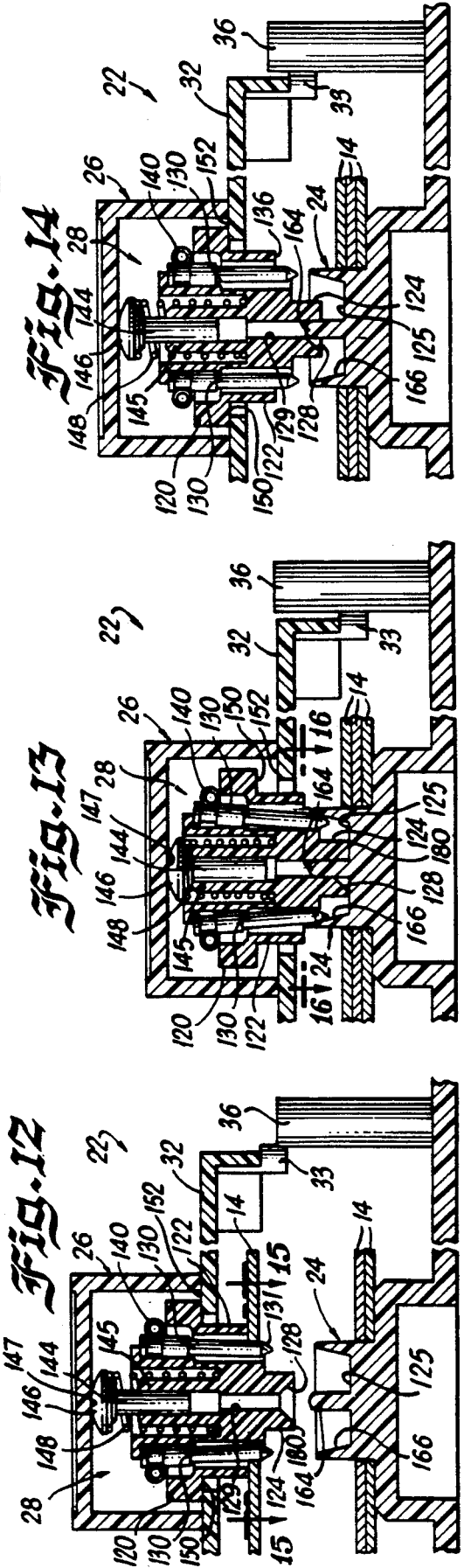

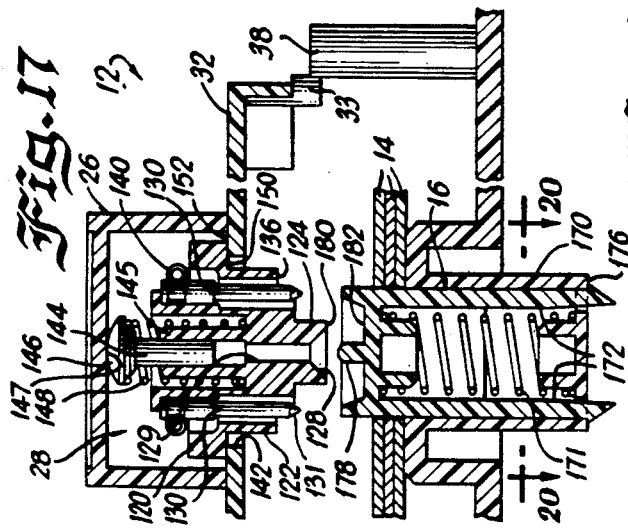

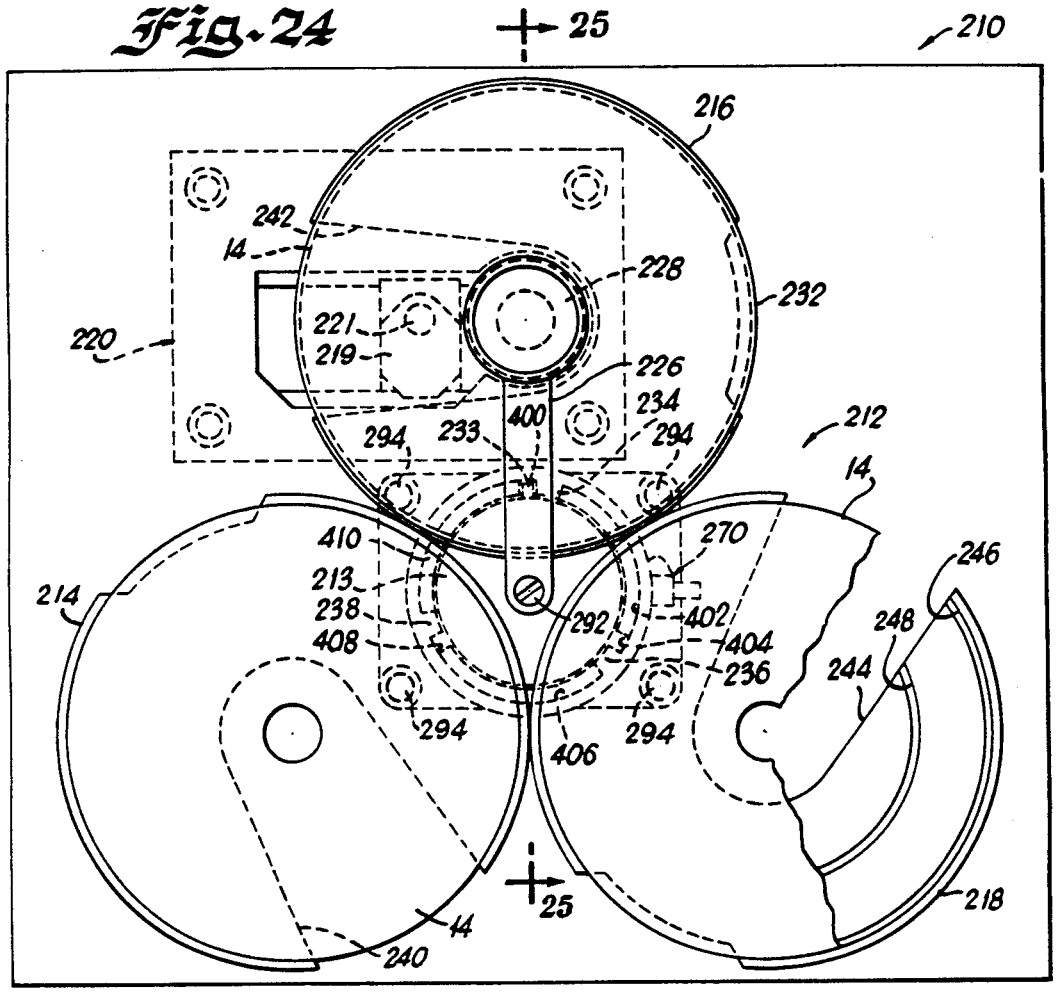
Fig. 24
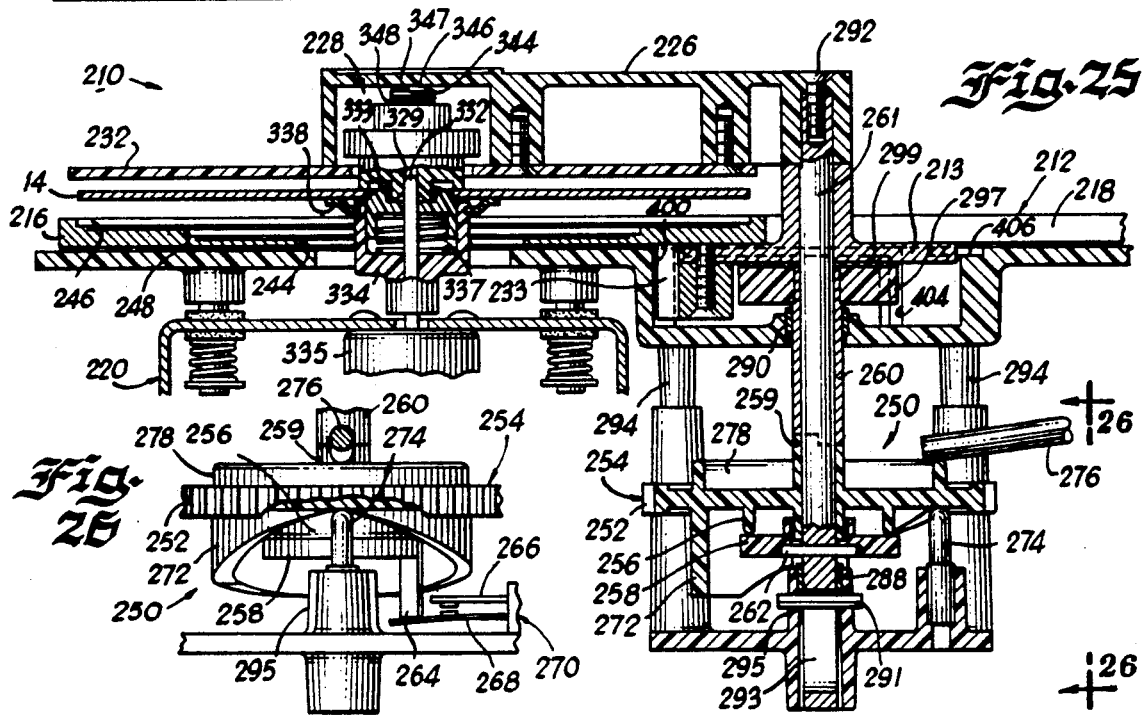
Fig. 25
Fig. 26

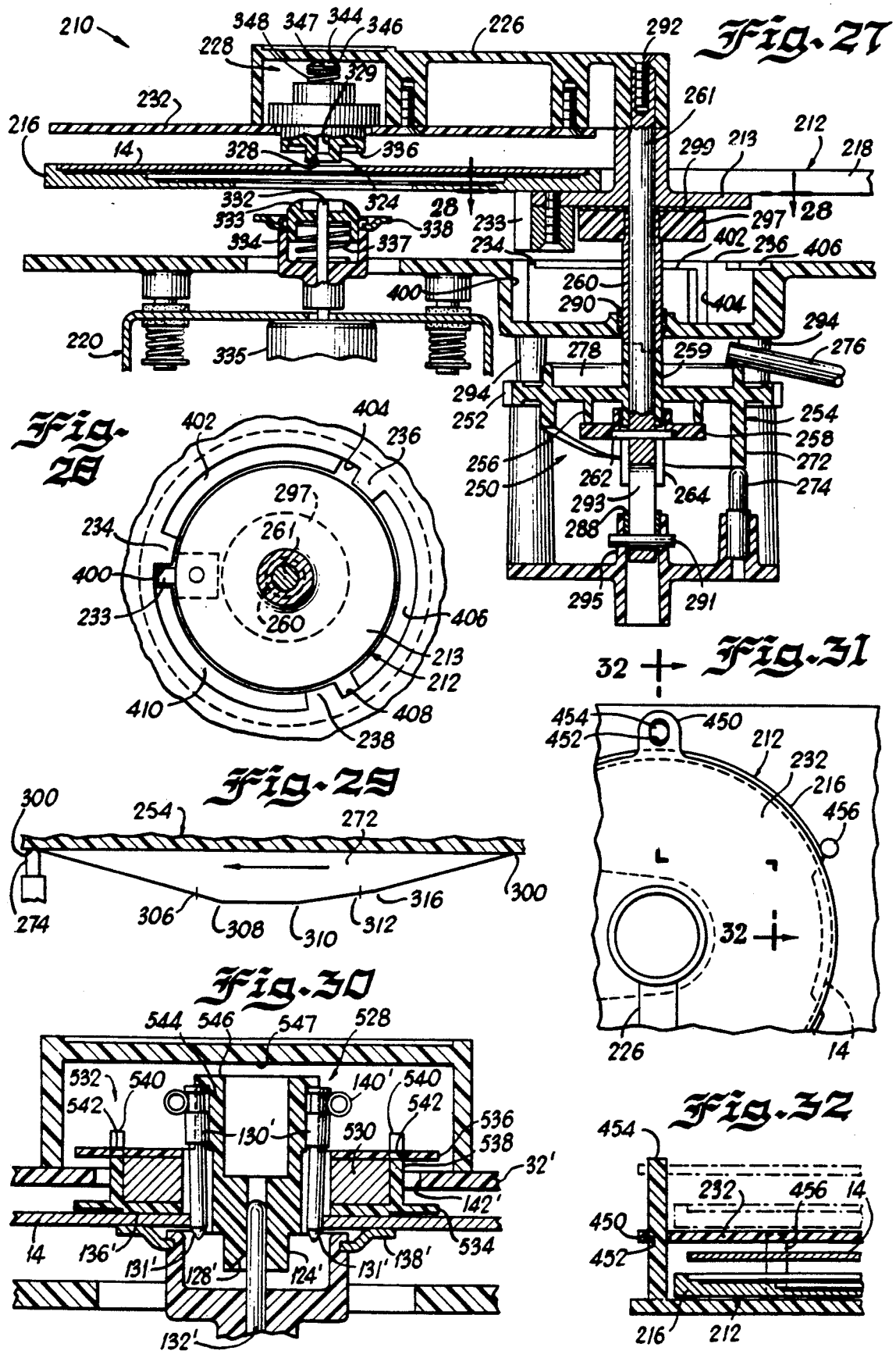

AUTOMATIC CHANGER FOR DIGITAL DISCS

BACKGROUND OF THE INVENTION

1. Field of the Invention

This invention relates generally to digital disc changers capable of reading or writing on discs and, more particularly, to digital disc changers capable of playing back music and video information.

2. Description of the Prior Art

Disc changers capable of automatically playing a plurality of digital discs are known. One type of such known changer utilizes cartridges that can each receive a plurality of discs. A cartridge is loaded with discs and inserted into the changer and the discs are sequentially played in any desired order.

In another type of disc changer, a carousel that is loaded with a plurality of discs is employed to position individual ones of the discs sequentially in a position over a play mechanism. Once the disc is in position, the play mechanism is raised from below the carousel and raises the disc from the carousel to a playing position where the disc is played. Such carousels may be accessible from the top of the changer, for example, by opening a dust cover, or may be located in a movable drawer or tray. Other types of disc changers utilize a plurality of individual trays that extend and retract like drawers and each receive a single disc to be played in a selected order. Still other changers utilize such a single disc tray for single play and a cartridge for playing multiple discs.

While these changers provide a way to play multiple discs, the systems employing a cartridge require that the cartridge be loaded before a disc is played even if only a single disc is being played. Also, systems employing a cartridge require that play be interrupted when the discs in the cartridge are being changed. In addition, it is difficult to remember the order in which the discs are arranged in the cartridge.

Systems that utilize a carousel that is contained in a drawer or tray also require play to be interrupted when a disc is being removed from or added to the carousel, and all carousel systems require a mechanism to move the playing mechanism with the reading head up and down during a changing cycle. Also, the carousel becomes relatively large when it is designed to accommodate a large number, e.g. more than three, discs.

SUMMARY

Accordingly, it is an object of the present invention to provide a disc changer that overcomes many of the disadvantages of the prior art disc changers.

It is another object of the present invention to provide an automatic disc changer that is simpler and more convenient to use and more economical to manufacture than the prior art changers.

It is another object of the invention to provide a digital disc changer that is capable of accommodating a large number of discs while still retaining compact proportions.

It is yet another object of the present invention to provide a changer that permits discs to be added to or removed from the unit, or the order of the discs to be changed, without interrupting play.

It is yet another object of the invention to provide an automatic disc changer that permits a single disc to be conveniently played.

Thus, in accordance with a preferred embodiment of the invention, there is provided an automatic multi-disc changer that utilizes three stations: a loading station where a plurality of discs may be stacked, a play station where a disc is played, and a discard station wherein discs that have been played are discarded. A robot arm that includes a pick-up head for picking up the discs is used to engage the top disc in a stack at the loading position through the center hole in the disc and transport it to the play station where it is lowered by the arm into play position. The pick-up head in the robot arm applies pressure to the top of the disc and is freely rotatable and maintains the disc in frictional engagement with a drive mechanism that rotates it during play. Once play has been completed, the robot arm carries the disc to the discard station and places it over another spindle where discs that have been played are stacked. The robot arm pivots about an axis that is equidistant from the loading, play and discard stations so that a simple circular motion of the robot arm may be achieved. The robot arm is driven via a clutch mechanism that permits relative motion between the drive motor and the arm. The arm is registered at its various stations by posts or other stops located on the base of the changer to eliminate the need for a precision drive mechanism for the arm. Preferably, the robot arm rotates in a single direction from the loading station to the play station to the discard station and then back to the loading station to pick up another disc for play. The unidirectional motion eliminates the need for a bidirectional motor and simplifies the control electronics as well as the registering and stopping mechanism; however, bidirectional drive may be used, for example in situations where it is desired to change the relative positions of the three stations. For example, the three stations may be arranged in a linear pattern and a bidirectional linear transport used to transport discs between stations. In another embodiment, the discs may be transported between stations in an arcuate bidirectional motion by an arm similar in motion to a windshield wiper arm.

In accordance with an alternative embodiment of the invention, a carousel is used in place of the robot arm to transport discs to the play station for playing and away from the play station after play has been completed. The carousel employs a plurality of receptacles for receiving discs to be played. Each time a new disc is to be played, the carousel is raised and rotated to place the disc to be played over the reading head at the play station, while any disc that has just been played is moved away from the reading head. Once the disc to be played has been positioned over the reading head, the carousel is lowered to place the disc into playing position. An arm housing with a rotatable retaining member is disposed over the center of the disc at the playing position and exerts a force on the disc so that the disc may be frictionally engaged for rotation by the playing mechanism. As in the case of the robot arm, the carousel is driven by a clutch that permits relative movement between the carousel driving motor and the carousel, and the carousel is registered in the playing position by registering stops on the base to eliminate the need of a precision servomotor to drive the carousel.

BRIEF DESCRIPTION OF THE DRAWING

These and other objects and advantages of the present invention will become readily apparent upon consideration of the following detailed description and attached drawing, wherein:

FIG. 3 is a cross-sectional view taken along line 3—3 of FIG. 1 also showing the robot arm in the play position;

FIG. 4 is a cross-sectional view taken along line 4—4 of FIG. 3 showing the cam that controls the operation of the robot arm;

FIG. 5 is a partial view taken along line 5—5 of FIG. 3 also showing the cam that controls the robot arm;

FIG. 7 is a cam profile of the cam that lifts and rotates the robot arm;

FIG. 8 is a perspective view of the pick-up head that engages the center hole of a disc;

FIG. 9 is a cross-sectional view taken along line 9—9 of FIG. 3 showing details of the pick-up head of the robot arm;

FIG. 10 is a cross-sectional view taken along line 10—10 of FIG. 9 showing further details of the pick-up head of the robot arm when the robot arm is in the play position;

FIG. 11 is an enlarged cross-sectional view of one of the pins in the pick-up head of the robot arm;

FIGS. 12-14 are cross-sectional views of the pick-up head of the robot arm taken along line 12—12 of FIG. 1 showing the operation of the pick-up head when a disc is discarded at the discard station;

FIG. 15 is a cross-sectional view taken along line 15—15 of FIG. 12 showing the pick-up pins of the pick-up head in a disc engaging position;

FIG. 16 is a cross-sectional view taken along line 16—16 of FIG. 13 showing the pick-up pins shown in a disc releasing position;

FIGS. 17-19 are cross-sectional views taken along line 17—17 of FIG. 1 illustrating the operation of the pick-up head of the robot arm during pick up of a disc at the pick-up station;

FIG. 20 is a cross-sectional view taken along line 20—20 of FIG. 17 showing the spindle at the pick-up station;

FIG. 21 is a perspective view, partially in cross section, showing details of the spindle at the pick-up station;

FIG. 22 is an enlarged view showing a typical disc pick-up operation;

FIG. 23 is a perspective view showing the locus of motion of the robot arm and pick-up head during a complete cycle from the play station to the discard station to the loading station and back to the play station;

FIG. 24 is a plan view of an alternative embodiment of the disc changer according to the invention;

FIG. 25 is a cross-sectional view taken along line 25—25 of FIG. 24 illustrating a disc positioned in the play position;

FIG. 26 is a partial view taken along line 26—26 of FIG. 25 showing the cam that controls the vertical motion of the carousel;

FIG. 27 is a cross-sectional view similar to FIG. 25 showing a disc positioned in the carousel with the carousel in a raised position over the play station;

FIG. 28 is a cross sectional view taken along line 28—28 of FIG. 27 showing an indexing mechanism for the carousel;

FIG. 29 is a cam profile of the cam that lifts and rotates the carousel;

FIG. 30 illustrates an alternative embodiment of the robot arm;

FIG. 31 illustrates an alternative mechanism for registering the carousel and registering the retaining arm; and FIG. 32 is a cross sectional view taken along line 32—32 of FIG. 31 also showing the alternative embodiment for the carousel and the retaining arm.

DETAILED DESCRIPTION OF THE PREFERRED EMBODIMENT

Figure 1:
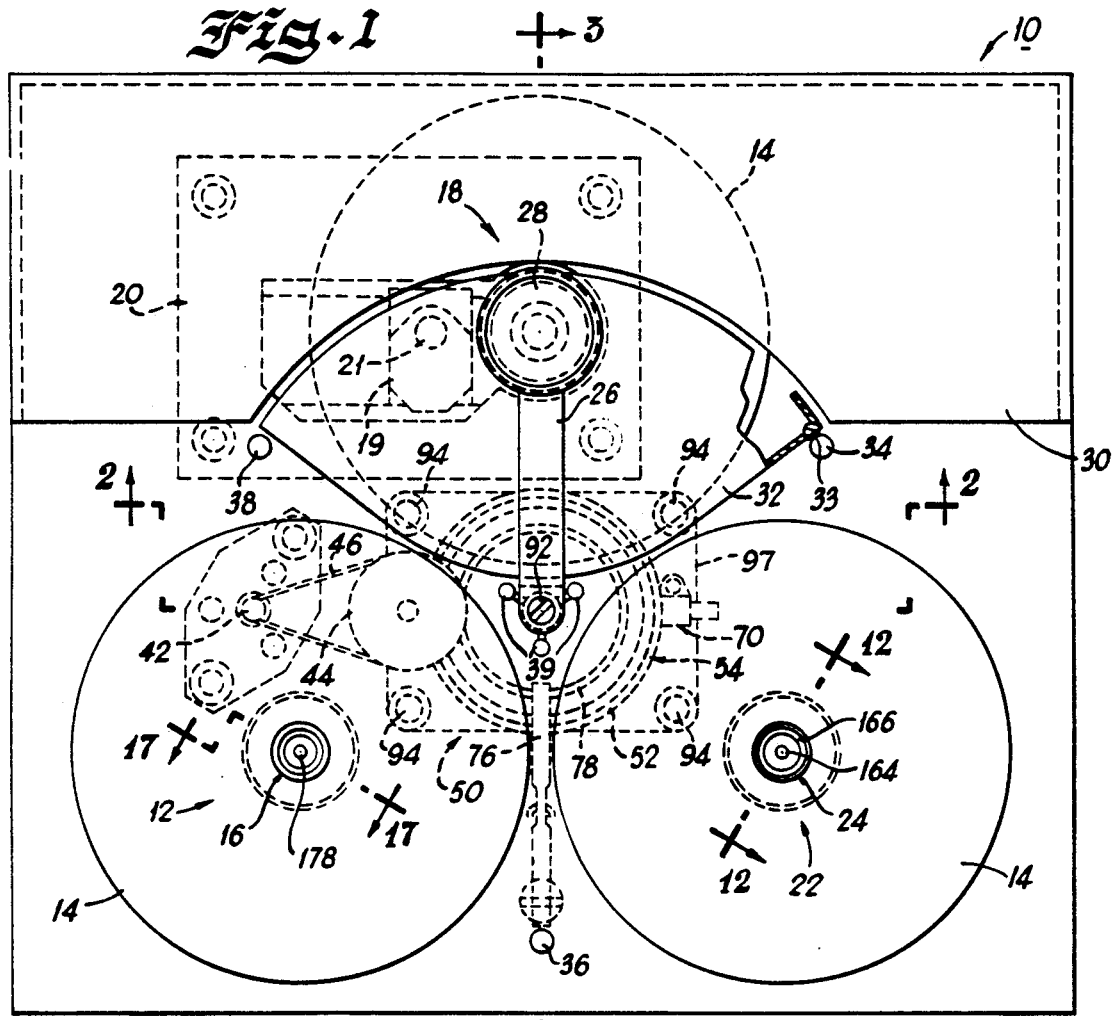
FIG. 1 is a plan view of the disc changer according to the invention.

Referring now to the drawing, with particular attention to FIG. 1, there is shown a disc changer according to the present invention generally designated by the reference numeral 10. The changer 10 includes a loading station 12 where one or more discs 14 to be played may be stacked on a spindle 16 and a play station 18 wherein one of the discs 14 is rotated and information encoded on the bottom side of the disc is read by a playing mechanism 20 that includes a movable reading head 19 that includes an optical reader 21; however, other types of readers, for example, a magnetic or other type of reader, can be used depending on the type of disc being read. Also, a writing mechanism capable of writing digital or other information magnetically, optically, thermally or otherwise onto a disc can be used if a writing or recording capability is to be provided. The playing mechanism 20 is a standard playing mechanism that is used in compact disc players and is available from various manufacturers, including Sony Corporation and Philips Corporation among others.

The changer 10 also includes a discard station 22 wherein discs 14 that have been played are stacked about a spindle 24. A robot arm 26 that has a pick-up head 28 rotates in the clockwise direction when viewed from the top to pick up a disc 14 from the loading station 12 to the play station 18 wherein the disc 14 is played. After play, the disc is transported by the arm 26 to the discard station 22 where it is discarded. After the played disc has been discarded, the robot arm 26 is again rotated to the loading station 12 where another disc 14 is picked up and transported to the play station. A fixed shield 30 and a movable shield 32 that rotates with the robot arm 26 prevent access to the disc 14 during play at the play station 18. However, either of these shields may be transparent to provide a view of the disc 14 during play. The shield 32 has a downwardly-extending post 33 that cooperates with three registering posts 34, 36 and 38 that serve to register the robot arm in the play, discard and loading positions, respectively, as will be discussed in a subsequent portion of the specification. Three centrally located posts 39 prevent the arm 26 from being lowered when it is positioned between stations. The robot arm 26 is driven by a motor 40 via a pair of pulleys 42 and 44 and a drive belt 46. A pinion gear 48 is fixed to the pulley 44 and drives a cam and clutch assembly 50 that rotates the robot arm 26 between stations and raising the arm 26 for travel between stations and lowering it at the loading, play and discard stations.

Figures 2, 6:
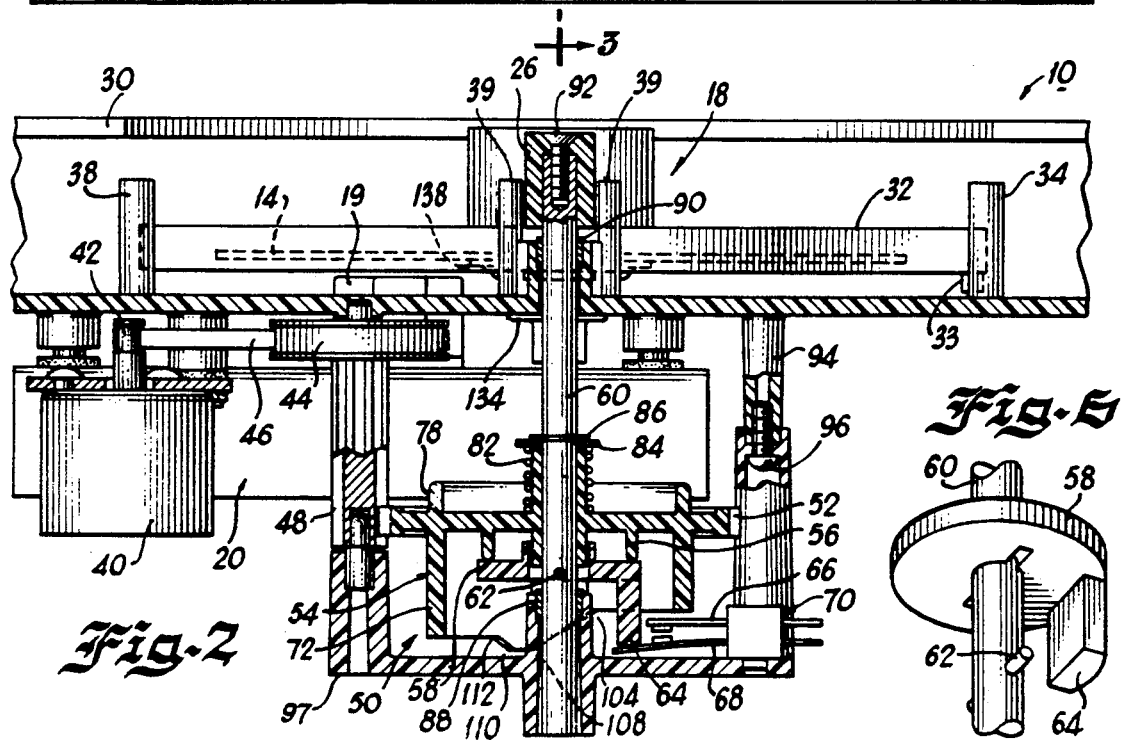
FIG. 2 is a cross-sectional view taken along line 2—2 of FIG. 1 showing the robot arm positioned in the play position.
FIG. 6 is a perspective view of the driven member that cooperates with the cam to form a clutch that drives the robot arm and operates a switch that applies power to the arm driving motor.

Referring to FIG. 2, the drive motor 40 drives the pinion gear 48 via the pulleys 42 and 44 and the belt 46. The pinion gear 48 engages a gear 52 on a driving member 54 of the cam and clutch assembly 50. The driving member 54 has a downwardly-extending ring-shaped member 56 that engages a driven member 58 that drives a shaft 60 that rotates the robot arm 26. A pin 62 extends through the shaft 60 and is keyed into the driven member 58 to provide registration between the driven member 58 and the shaft 60. The driven member 58 has a downwardly extending portion 64 that controls the operation of a pair of switch contacts 66 and 68 of a switch 70 as will be subsequently described. The driving member 54 also includes a downwardly-extending cam member 72 that engages a cam follower 74 (FIG. 3). A pivoted rod 76 is used to exert downward pressure on an upwardly-extending ring-shaped member 78 of the driving member 54, and an extension spring 80 connected at one end to rod 76 and the other end to the base member is used to bias the rod 76 downwardly in order to bias the driving member 54 downwardly to maintain the cam member 72 in contact with the cam follower 74. A compression spring 82 that is held in position by a washer 84 and a C-washer 86 that engages a groove in the shaft 60 is used to bias the downwardly-extending ring member 56 of the driving member 54 into frictional engagement with the driven member 58 so that the driven member 58 may be rotated by the driving member 54. Thus, the driving members 54 and the driven member 58 cooperate to form a slip clutch. The shaft 60 is rotatably supported by a pair of bearings 88 and 90 and affixed at the upper end of the shaft 60 to the robot arm 26 by a screw 92. The robot arm 26 is positioned relative to the downwardly-extending portion 64 of the driven member so that the portion 64 is positioned to actuate the contacts 66 and 68 of the switch 70 when the arm 26 is at the play station 18. Four downwardly-extending posts 94 and screws 96 (FIG. 2) support lower base 97 that supports the cam and clutch assembly 50.

In operation, the cam and clutch assembly 50 serves to rotate the robot arm 26 between the loading station, the play station and the discard station. The normal or home position of the arm 26 is the play position at the play station as is shown in FIGS. 1-3. In a typical disc changing cycle, the robot arm is rotated clockwise (when viewed from the top) one complete revolution from the play position at the play station, to the discard station, to the loading station and back to the play station. During such a disc changing cycle, the driving member 54 is rotated three complete revolutions, once for each transition between the three stations, while the driven member 58 which is affixed to the robot arm shaft 60 is driven only one revolution from the playing station to the other two stations and back to the play station. During each revolution of the robot arm, the cam member serves to raise and lower the robot arm three times, i.e., to raise the robot arm for its travel between stations and to lower it over each of the three stations so that the functions of disc pick up, play and discard may be achieved. In a typical disc changing cycle, the disc changing operation will begin from the play station as shown in FIGS. 1-3. In the play station, the robot arm 26 and the driving member 54 and the driven member 58 will be at their bottom most positions. The driven member 58 is positioned so that the downwardly-extending portion 64 engages the switch contact 68 thereby opening the switch contacts 66 and 68 and deenergizing the motor 40 so that the robot arm 26 will remain stationary in the position shown in FIGS. 1-3. When a changing cycle is initiated, the motor 40 is energized with a momentary pulse of current. This momentary pulse of current can be initiated, for example by manually operating a switch on the changer that initiates the changing cycle, or may be generated by electronic means that senses an end-of-disc signal generated by the reading unit 20 when the playing of a disc has been completed and generates the momentary pulse in response thereto.

Upon the generation of the momentary pulse, the motor 40 rotates the driving member 54 in a clockwise direction when viewed from the top. During this momentary pulse of current, the driving member 54 will rotate and will attempt to rotate the driven member 58 along with it. However, because the post 33 on the shield 32 (which rotates along with the arm 26 and the driven member 58) is engaged by the pin 34, the arm 26 and the driven member 58 will be unable to rotate. However, since the driving member 54 is positively engaged by the pinion gear 48 which is driven by the motor 40, it will rotate and slippage between the downwardly-extending ring member 56 and the driven member 58 will occur. Thus, the driving member 54 will rotate while the driven member 58 will remain stationary.

As the driving member 54 rotates, the cam member 72 will be in contact with the cam follower 74, thus causing the driving member 54, the driven member 58, the robot arm 26 and the shield 32 to raise, and the teeth of the gear 52 of the driving member 54 will ride up the pinion 48. As the driven member 58 is raised, the downwardly-extending portion 64 will also be raised, thereby allowing the contacts 66 and 68 to close and apply electrical power to the motor 40 for the rest of the changing cycle. The closed contacts 66 and 68 will maintain power to the electric motor 40 until the changing cycle is complete and the robot arm 26 is returned to the play station and lowered, whereupon the contacts 66 and 68 will be opened by the downwardly-extending portion 64.

The raising and lowering operation of the arm 26 at each station is best illustrated in conjunction with FIG. 7 which shows a linearized or flattened out depiction of the cam profile. As shown in FIG. 7, when the arm 26 is at the play station, the cam and clutch assembly 50 and the arm 26 are in their lowest positions with the cam follower 74 engaging the cam 72 at its lowest point 100 (left side). During the occurrence of the momentary pulse of current, the cam 72 begins to rotate in a direction which corresponds to a right-to-left movement of the cam 72 shown in FIG. 7. When this occurs, the cam follower 74 rides the slope between the point 100 and a point 102 thus lifting the cam and clutch assembly 50 and the arm 26. During the initial travel between the point 100 and the point 102, the cam and clutch assembly 50 is lifted sufficiently to allow the closing of the contacts 66 and 68 to maintain power to the motor 40 after the momentary pulse of current has ended.

As the cam continues to rotate, it and the arm 26 will be raised by an amount corresponding to the height of the cam at the point 102 at which a dwell time between the point 102 and 104 will commence, wherein the raising of the arm 26 will be temporarily suspended and the height will be maintained at a dwell height defined by the height of the cam between the points 102 and 104. The dwell time is necessary for the disc pick-up operation and will be discussed in detail in a subsequent portion of the application. Also, the dwell height need not be a constant height as shown, but may be a slowly changing variable height. Also, the cam profile may take the form of a single straight or curved line segment between points 100 and 104 rather than the two segment profile shown.

While the arm 26 has been partially raised during the time it takes for the cam 72 to rotate between the points 102 and 104, the height that it has been raised is insufficient to allow the post 33 on the shield 32 to clear the post 34. Thus, even though the driving member 54 and the cam 72 will continue to rotate, the driven member 58 and the arm 26 will not rotate.

When the point 104 is reached, the raising of the arm will proceed until the arm 26 is raised sufficiently to permit the post 33 to clear the post 34. The arm 26 is raised sufficiently to allow the post 33 on the shield 32 to clear the post 34 at a point that corresponds to a point 106 on the cam in FIG. 7. Thus, as the cam 72 continues to rotate after the point 106 has been reached, the driven member 58, being frictionally engaged by the driving member 54, will rotate and cause the arm 26 and the shield 32 to rotate also.

As the cam 72 continues to rotate, it is raised further to its highest point at a point corresponding to point 108 in FIG. 7. The arm 26 is maintained at its highest point for a time sufficient to permit the post 33 of the shield 32 to move over the post 34. The post 34 passes by the post 33 at a point that corresponds to a point 110 in FIG. 7, and beginning at point 110, the arm 26 is slightly lowered to a height corresponding to point 112, to allow for later engagement of post 33 of the shield 32 with the registering post 36. Once the post 33 has cleared post 34, the arm 26 and the shield 32 rotate clockwise when viewed from the top approximately 120 until the post 33 engages the post 36 between the discard station 22 and the loading station 12 (FIG. 12). This position corresponds to point 114 on the cam profile of FIG. 7, the pick-up head 28 on the arm 26 will be positioned almost directly over the discard spindle 24. The arm 26 will remain stationary over the discard station 22 but the cam 72 will continue to rotate until a point 116 is reached. The arm 26 will then be lowered until it reaches the position shown in FIG. 13 when the cam 72, having made a complete 360° revolution, will be positioned with the point 100 positioned above the cam follower 74. At this point, the pick-up head 28 will be lowered over the spindle 24 of the discard station 22 (FIG. 13). As the pick-up head 28 is lowered by the spring biased arm 76 (FIG. 3) to the position shown in FIG. 13, with a centering projection 124 contacting a top surface 125 of the spindle 24 and a pin 144 being completely bottomed at a sleeve portion 145 of the head 28. Thus, the downward motion of the head 28 is stopped. The cam follower 74 does not engage the point 100 of the cam 72 because the head 28 cannot be lowered at the discard station 22 sufficiently for the cam follower 74 to maintain engagement with the cam 72.

After the arm 26 is lowered over the discard station 22, any disc held by the pick-up head 28 will be stacked on the spindle 24. However, at this point, the contacts 66 and 68 will still be closed because the downwardly-extending portion 64 is rotated away from the switch 70 and, consequently, the cam 72 will continue to rotate. Thus, the cam follower will again contact the cam 72 from a point between the point 100 to the point 102 to raise the arm 26 to its dwell position between points 102 and 104. During this time, the post 33 of the shield 32 will engage the post 36 between the discard station 22 and the loading station 12 and, consequently, the arm will remain stationary over the discard station 22 until the point 106 is again reached, at which point the post 33 is raised high enough to clear the post 36 to permit the arm 26 to rotate. Then the post 33 moves over the post 36, the arm 26 is again lowered to the position corresponding to point 112 in FIG. 7 and the arm continues to rotate until the post 33 of the shield 32 engages the post 38 between the loading station 12 and the play station 18 at the position corresponding to point 114 in FIG. 7 to provide a total of 120° of additional rotation. At this point, the pick-up head 28 of the arm 26 is positioned over the spindle 16 which contains a stack of discs 14 to be played. The arm 26 is again lowered beginning at point 116 so that one of the discs on the spindle may be picked up (FIGS. 17-19). The arm 26 continues to be lowered until the cam 72 is positioned with the point 100 being positioned above and spaced from the cam follower 74 after a second complete revolution of the cam 72. At this point, the arm 26 will be positioned as shown in FIG. 18 with the pin 144 being completely bottomed on the sleeve portion 145 by a biasing force exerted by the rod 76, with a surface 136 of the head 28 engaging the top disc 14 on the spindle 16, and the pick-up head 28 engaging the center hole of the top disc of the stack of discs 14 present on the spindle 16. At this point, the contacts 66 and 68 are still closed and, consequently, the cam 72 continues to rotate. As in the previous two cases, the cam 72 continues to rotate, but the arm 26 does not rotate because the post 33 of the shield 32 is engaged by the post 38. As the cam rotates to the beginning of the dwell time at point 102 on FIG. 7, the arm is raised sufficiently to permit the pick-up head 28 to raise a disc over the top of the spindle 16 at the pick-up station 12 (FIG. 19). The arm 26 remains above the spindle 16 (FIG. 19) during the dwell time between points 102 and 104. The reason for the dwell period is that occasionally two discs may stick together due to a vacuum between the discs or for other reasons. Thus, to assure that only a single disc is transported to the play station, the pick-up arm is caused to dwell over the spindle for about a one to two second time period between the points 102 and 104 (or corresponding points if a different cam profile is used) to permit the second disc to drop back onto the spindle 16 during the dwell period in the event that more than one disc has been picked up.

In an alternative way to provide a dwell time, the dwell between points 102 and 104 on the cam profile may be eliminated and the dwell provided electronically. In such an embodiment, the motor 40 driving the cam and clutch assembly 50 may be momentarily deenergized to stop the cam 72 for the required dwell time, for example, 1-2 seconds. The timing of the deenergization of the motor 40 may be controlled by the electronic circuitry that controls the operation of the changer.

After the dwell period, the arm is raised further to the point corresponding to point 106 so that the post 33 of the shield 32 clears the post 38 and the arm is again rotated 120° and lowered at point 112 until the post 33 engages the post 34 and the arm 26 is again positioned over the play station 18. The arm 26 is again lowered to position the disc 14 in the play position as the cam rotates from the point 116 back to the point 100. Only at the play station is the downwardly-extending portion 64 of the driven member 58 aligned with the switch 70.

Consequently, when the arm 26 is lowered to the play position, the contacts 66 and 68 are opened and the motor 40 is deenergized until the next changing cycle is initiated.

The electronics associated with the operation of the changer sense the opening of the switch 70 and cause the reading head 19 to sense whether or not a disc 14 is present at the play station 18. If a disc 14 is sensed, play is initiated. If no disc 14 is present, the reading head 19 will remain in an idle mode of operation. Thus, after the last disc has been played, the changer will be in an idle mode.

The movement of the pick-up head 28 of the arm 26 is graphically illustrated in FIG. 23 which shows the locus of points travelled by the head during a complete changing cycle. FIG. 23 shows how the head 28 is raised and lowered three times during the changing cycle, and shows that the raising and lowering action is identical for each of the stations because the raising and lowering action is controlled by the cam 72 which makes one complete revolution as the head travels from station to station. The various heights of the arm 26 as it travels between stations are also illustrated in FIG. 10.

The pick-up head 28 is illustrated in FIG. 8. The pick-up head 28 includes a housing having a larger diameter section 120 and a smaller diameter section 122 as well as the centering projection 124 that has a conical surface 128 and a centering hole 129 formed at the bottom thereof. One or more pins 130 having pointed ends 131 are resiliently biased to engage the central hole of a disc. The pick-up head 28 cooperates with the spindles at the various ones of the stations to provide different functions. For example, at the play station, the conical portion 128 cooperates with a pin 132 (FIG. 3) that is centered within a drive spindle 134 that is driven by a disc drive motor 135 to center the disc 14 being played on the flange 138. In addition, the bottom surface 136 (FIG. 8) of the housing of the head 28 exerts a downward pressure provided by a compression spring 148 on the disc 14 during play so that the disc may be frictionally engaged by a flange 138 affixed to the spindle 134 to cause the disc 14 to rotate. Since the head 28 is free to rotate when in the playing position, it will rotate along with the disc 14. The pins 130 are resiliently retained within the head 28 by a coiled extension spring 140 that registers the pins 130 in a substantially parallel relationship with each other with a spacing designed to permit them to engage the central hole of a disc 14. Alternatively, an elastic band made from rubber or the like, or any other resilient biasing means may be used in place of the spring 140. The resiliency of the spring 140 exerts an outward force on the central hole to permit the disc to be lifted, and also permits the lower ends of the pins 130 to be urged inwardly by a ring on the discard spindle 24 to cause the disc to be released, as will be discussed at a subsequent portion of the specification.

The pick-up head 28 is illustrated in greater detail in FIG. 10 which shows the pick-up head 28 positioned in the play position. In the play position, the centering hole 129 of the centering projection 124 is centered about the pin 132 and serves to center the pick-up head 28 over the spindle 134 and driving flange 138. The centering is provided by the pin 132 thus eliminating the need for precise tolerances in the arm 26 and in the arm registering mechanism. The disc 14 is centered by a centering section 141 that accurately centers the disc 14 on the flange 138 for rotation by the motor 135. The pick-up head 28 is retained within the arm 26 within an aperture 142 that has a diameter larger than the diameter of the body portion 122, but a smaller diameter than the diameter of the body portion 120. Thus, the aperture 142 serves to retain the pickup head 28 within the arm 26, but permits a lateral movement of the pick-up head 28 within the arm 26. Thus, as the arm 26 is moved from station to station, the pick-up head needs to be only generally positioned by the arm 26 over the spindle of each station, with precise positioning being provided by central pins in the various stations that are guided by the conical surface 128 into the centering hole 129 and position the centering projection 124 and consequently the pick-up head 28 precisely over the appropriate spindle. A second pin 144 is received in a sleeve portion 145 of the head 28. The pin 144 has a head 146 that cooperates with a compression spring 148 to bias the pick-up head downwardly into contact with the shield 32 when the arm 26 is raised.

When the arm 26 is in the play position as is shown in FIG. 10, and the arm 26 has been lowered with the surface 136 still in contact with the disc 14 and the spring 148 is partially compressed. Thus, the spring 148 exerts a downward force on the disc 14 via the surface 136. The head 146 of the pin 144 contacts an interior surface of the arm at a point 147 that serves as a pivot point. This causes the disc 14 to be in good frictional engagement with the flange 138 and also provides a pivot point that permits the head 28 to rotate within the end of the arm 26 as the disc 14 is rotated for play by the rotation of the flange 138.

After play has been completed, and the arm 26 is raised, the spring 148 biases the pick-up head 28 downwardly through the aperture 142 until a surface 150 of the housing of the pick-up head 28 engages an interior surface 152 of the shield 32. The arm then is rotated and moved toward the discard station as is illustrated in FIG. 12.

FIG. 11 shows one of the pins 130 in detail when it engages the center hole of a disc. The coiled extension spring 140 engages a reduced diameter section 154 of the pin 130 and exerts an inwardly-directed radial force on the section 154. Thus, when no disc is engaged, and end 156 of the pin 130 engages an inner surface 158 of the housing supporting the pin 130, and a body portion 157 of the pin 130 engages the lower portion inner surface 158 causing the pin 130 to be substantially vertical and stationary. However, when a disc is engaged, the end of the pin 130 is urged radially inwardly by the central aperture of the disc, thus causing the pin to pivot about a point 160, thus moving the end 156 from the surface 158 as shown in FIG. 11. The inwardly-directed radial bias from the spring 140 is then translated by the fulcrum point 160 to an outwardly-directed radial bias at the tip of the pin 130 against the portion 162 of the disc 14 central aperture.

As previously stated, when the disc is lifted from the play station 18, it is then transported to the discard station 22 and released there. During the transport, the arm 26 rotates clockwise when viewed from the top from the play station to the discard station until the downwardly extending post 33 engages the post 36 to generally line up the pick-up head with the spindle 24, as is illustrated in FIG. 12. At this point, the pins 130 are still in engagement with the central aperture of the disc 14, as is illustrated in FIGS. 12 and 15.

In accordance with another important aspect of the invention, the spindle 24 is provided with a centering pin 164 that engages the conical surface 128 as the pickup head 28 is lowered in order precisely to center the pick-up head 28 over the spindle 24 by the pin 164 engaging the hole 129. In addition, the spindle 24 has a slanted inner surface 166 that engages the pins 130 and moves them radially inwardly against the force of the spring 140 as the pick-up head 28 is lowered. The points 131 of the pins 130 are arranged on a circle having a diameter that is smaller than the diameter of the circle defined by the upper portion of the surface 166. Thus, as the head 28 is lowered by the biasing force of the extension spring 80 biasing the rod 76 (FIG. 3), the conical surfaces of the points 131 ride along the rim of the spindle 24 defined by the surface 166 and are urged inwardly a sufficient amount to cause the disc 14 to be released (FIGS. 13 and 16). The head 28 is biased by the rod 76 (FIG. 3) so that the pin 144 is bottomed against the sleeve portion 145 when the surface 180 of the projection 124 of the head 28 contacts a surface 125 of the spindle 24. As the head is again raised, the pins 130 are returned to their substantially vertical position as is shown in FIG. 14, and the empty pick-up head is then transported to the loading station 12.

As the arm 26 rotates clockwise from the discard station to the loading station, it continues to rotate until the downwardly depending post 33 contacts the upwardly-extending post 38 to position the pick-up head 28 generally over the spindle 16 at the loading station (FIG. 17). The spindle 16 is different than the spindle 24 at the discard station in that it is not rigidly mounted to the base of the changer, but rather moveably retained in a sleeve 170 and biased upwardly by a compression spring 171. The spindle 16 is retained within the sleeve 170 by a pair of downwardly depending legs 172 (FIG. 21) that each have a hook portion 174 that engages a lower surface 176 of the sleeve 170. Thus, the spindle 16 is resiliently biased in an upward position, but may be easily urged downwardly.

As the head 28 is lowered over the spindle 16, it is centered by a centering pin 178 that engages the conical surface 128 of the head 28. As the head is further lowered, the bottom surface 180 (FIG. 8) of the centering protrusion 124 of the head 28 contacts a horizontal surface 182 near the top of the spindle 16 and the pin 178 engages the hole 129. Thus, as the head 28 continues its downward motion, the spindle 16 will be pushed downwardly and the downward motion of the head 28 will continue until it reaches the position shown in FIG. 18.

Referring to FIG. 18, the head 28 will be lowered until the surface 136 contacts the top one of the discs 14 in the loading station. Once contact is made, the arm 26 will continue to lower, thus compressing the spring 148, and allowing the pin 144 to bottom on the sleeve portion 145 to provide a rigid contact between the arm 26 and the head 28. In this position, the pins 130 are pushed into the central aperture of the top one of the discs 14 and are being urged inwardly against the bias of the spring 140 by the central aperture of the disc 14 as shown in FIGS. 18 and 22. In this position, the pins 130 exert an outwardly-directed radial force against the walls of the central aperture of the top disc 14, thus clutching the disc 14 to the head 28 to permit the disc to be picked up as is shown in FIG. 19.

FIG. 19 shows the pick-up head 28 in a position that corresponds to the dwell position between points 102 and 104 on the cam profile of FIG. 7 or other suitable cam profile as previously discussed. In this position, the spring 148 has urged the head 28 to its downwardmost position with the surface 150 contacting the surface 152.

Also, the spring 171 has urged the spindle 16 upwardly to maintain contact with the centering protrusion 124 of the head 28 (FIG. 19). Consequently, if a second disc had been picked up, it would drop back onto the spindle 16 during the time that the head 28 is in the dwell position shown in FIG. 19. After the dwell period, the arm 26 is again rotated clockwise to the play position as shown in FIGS. 3 and 10. When no disc 14 remains on the spindle 16, the pick-up head 28 will return empty to the play station 18 and the mechanism will remain in an idle mode as stated before.

Referring now to FIG. 24, there is shown an alternative embodiment of the disc changer according to the invention generally designated by the reference numeral 210. The changer 210 utilizes a carousel generally designated by the reference numeral 212 that has a central hub 213 that supports three disc receiving pockets or receptacles 214, 216 and 218. A disc playing mechanism 220 has a movable reading head 219 that includes an optical reader 221, but as previously stated, could include another type of reader. Also, a writing mechanism capable of writing digital or other information magnetically, optically, thermally or otherwise onto a disc can be used if a recording capability is desired. The disc playing mechanism 220 is similar to the disc mechanism 20 disclosed in the previously described embodiment. In addition, the changer 210 includes a disc hold-down arm 226 and a retaining head 228. A shield 232 is affixed to the portion of the arm 226 containing the head 228 and may be transparent to view the disc on the playing mechanism. Each of the receptacles 214, 216 and 218 has an elongated cutout 240, 242 and 244, respectively, formed therein so that the bottom of the disc 14 can be read by the reading head 219 while being rotated by the playing mechanism 220. In addition, two circular recesses of different sizes, such as the recesses 246 and 248 on the receptacle 218 are provided on each of the receptacles so that two different sized discs may be accepted.

The carousel 212 has a registering blade 233 (FIGS. 25 and 26) that extends downwardly from the central hub 213 and sequentially engages a plurality of registering blocks 234, 236 and 238 (that are analogous to the registering posts 34, 36 and 38 of the first embodiment) as the carousel is rotated so that each of the receptacles 214, 216 and 218 of the carousel 212 is properly positioned over the playing mechanism when in the play position. Although only a single registering blade 233 is shown, multiple registering blades that simultaneously engage multiple registering blocks may be provided.

Referring to FIG. 25, the carousel 212 is driven by a pinion gear (not shown) similar to the pinion gear 48 illustrated in FIG. 2 that engages teeth 252 of a driving member 254 that together with a wheel 297 and a clutch disc 299 forms part of a cam and clutch assembly 250. The driving member 254 includes a cam member 272 that engages a cam follower 274 and has a ring shaped member 256 that engages a member 258 that serves to capture the driving member 254 in place; however, other capturing members, for example, a C-washer can be used. The driving member 254 is coupled to a tubular shaft 260 that is rotatably supported by a shaft 261 that also supports the arm 226. The shaft 260 is step keyed to a boss 259 on the driving member 254. A pin 262 keys the member 258 in a non-rotatable relationship with respect to the shaft 261. The cam member 272 and the cam follower 274 cooperate to raise and lower the shafts 260 and 261 as the cam 272 is rotated. A spring-biased arm 276 (analogous to arm 76 of FIG. 3) exerts a downward biasing force on the rim 278 of the driving member 254. A bearing 288 supports the shaft 261 and a bearing 290 supports the tubular shaft 260. A screw 292 affixes the shaft 261 to the arm 226. A pin 291 passes through a slot 293 in the shaft 261 and through a sleeve 295 that supports the bearing 288 to prevent the shaft 261 from rotating inside the bearing 288 while permitting vertical motion. Four downwardly-depending posts 294 support a lower housing that supports the shaft 261, cam follower 274 and switch 270. The driving wheel 297 is driven by the shaft 260 and frictionally engages a clutch disc 299 disposed on the bottom of the carousel 212 to form a slip clutch. It should be noted that the carousel could directly contact the driving wheel 297 and thereby also form slip clutch means. Thus, when the driving member 254 is rotated, the carousel 212 is urged for rotation about the shaft 261 by the slip clutch formed by the wheel 297 and the clutch disc 299 or the carousel itself. Also, when the cam 272 is rotated, it moves up and down over the cam follower 274, and raises the carousel 212 and the arm 226 up and down a corresponding amount.

The cam member 272 is illustrated in FIG. 26 and the cam profile of the cam member 272 is illustrated in FIG. 29 in a flattened out or linear presentation similar to that of FIG. 7. When a disc changing operation is initiated, it is initiated in a manner similar to that described in conjunction with the robot arm embodiment. Prior to the initiation of a disc changing operation, the carousel 212 and the arm 226 are in their lowermost positions with the cam follower 274 contacting the cam 272 at a point 300 (left side) on the cam profile of FIG. 28. At this point, the blade 233 is recessed in a slot 400 adjacent the registering block 234 (FIG. 25). As the cam 272 is rotated, the carousel 212 and arm 226 are raised but the carousel does not rotate until a point 306 on the cam profile of FIG. 29 is reached and the blade 233 clears the registering block 234. Until the blade 233 clears the block registering block 234, the carousel 212 is prevented from rotating and slippage between the wheel 297 and the clutch disc 299 occurs. Once the registering block 234 is cleared by the blade 233, friction between the wheel 297 and disc 299 causes the carousel 212 to rotate. The arm 226 does not rotate, but both the arm 226 and the carousel 212 are raised to a point corresponding to a point 308 on the cam profile. The carousel 212 and arm 226 are slowly lowered to an intermediate position from a point 310 to a point 312 where the carousel 212 is in a high enough position to permit the blade 233 to stay above a groove 402, but not high enough to clear the registering block 236. The cam 272 and carousel 212 continue to rotate until a point 312 is reached where the blade 233 engages the registering block 236, the carousel 212 has been rotated 120° and the next receptacle 216 is in position above the playing mechanism 220. When the point 316 is reached, the blade 233 is moving down the slot 404 adjacent the registering block 236. The carousel 212 and the arm 226 are lowered during the travel of the cam 272 between points 316 and 300 so that the blade 233 may be received by the slot 404, thus completing the changing cycle. During this cycle, the cam 272 has rotated a full 360° between points 300 and the carousel has rotated 120°. The arm 226 was raised and lowered, but was retained in place over the playing mechanism 220. The process is repeated during the next changing cycle and the carousel is positioned with the blade 233 received in the slot 408. The changing cycle may be repeated as often as desired.

The changing cycle of the carousel embodiment is initiated in a manner similar to that disclosed in conjunction with the robot embodiment. As the carousel 212 and arm 226 are lowered to their lowermost positions between change cycles, the pin 274 contacts the point 300 of the cam 272 and the depending portion 264 of the member 258 opens a pair of contacts 266 and 268 of a switch 270 (FIG. 26). Thus, the motor (not shown) that drives the driven member 254 is deenergized. To initiate a changing cycle, the motor is energized with a momentary pulse of current of sufficient duration to permit the cam 272 to raise sufficiently to cause the depending portion 264 of member 258 (which does not rotate) to raise sufficiently to allow the switch contacts 266 and 268 to close. After the contacts 266 and 268 have closed, the motor is energized through the closed contacts until the cam makes a complete revolution back to the position shown in FIG. 26, thereby causing the depending portion 264 to be lowered sufficiently to open the contacts 266 and 268. As in the previous embodiment, when the contacts 266 and 268 are open, the control circuitry causes the reading mechanism 220 to determine whether a disc is present. If a disc is present, it is played, and when the play has been completed, an end-of-disc pulse is generated which causes the control electronics to again generate a momentary pulse of current to initiate another changing cycle. If no disc 14 is sensed, the reading mechanism 220 remains idle.

During the changing operation, the arm 226 is raised from the position illustrated in FIG. 25 to the position illustrated in FIG. 27 and returned to the position illustrated in FIG. 25 upon completion of the changing cycle. In the playing position illustrated in FIG. 25, the disc 14 is retained in engagement with a flange 338 on a motor shaft 334 that is driven by a disc driving motor 335. The head 228 is similar to the head 28 in the previous embodiment in that it utilizes a spring 348 to exert a downward bias on the head 228 to retain the disc 14 in place on the flange 338. The spring 348 surrounds a pin 344 that has a head 346 and causes the head 346 to engage a contact point 347 on the interior surface of the housing of the arm 226. The point 347 serves as a pivot point to permit the head 228 to rotate with the disc 14. The head 228 has a centering projection 324 (FIG. 27) that has a conical surface 328 in the end thereof that engages a centering pin 332 extending from the motor shaft. Thus, as the head 228 is lowered into engagement with the flange 338, the pin 332 engages the conical surface 328 that guides the pin 332 into a centering hole 329 and centers the head 228 over the disc 14. The disc 14 is centered by a resiliently mounted centering spindle 333 that is biased upwardly by a low-force compression spring 337. The centering spindle 333 engages the central aperture of the disc 14 as the carousel is lowered over the spindle 333 and centers the disc 14 over the driving flange 338. As the head 228 is lowered, the centering spindle is depressed by the spring 348 to a point sufficient to permit the surface 336 of the head 228 to frictionally retain engagement of the disc 14 to the flange 338.

In the embodiment illustrated in FIGS. 25 and 27, the arm 226 was retained over the play station 212 by the pin 291 that engaged the slot 293 that permitted vertical motion of the arm 226, but prevented the arm 226 from rotating. An alternative way to retain the arm 226 over the play station 212 is illustrated in FIGS. 31 and 32.

Referring to FIG. 31, the shield 232 has an extension 450 that has an elongated aperture 452 that engages an upstanding pin 454 that extends upwardly from the base of the changer. As is illustrated in FIG. 32, the aperture 452 and pin 454 are dimensioned to permit the shield 232 to move freely up and down as the arm 226 is raised and lowered, while still preventing the shield 232 and, hence, the arm 226 from rotating. The aperture 452 is elongated to accommodate variations in the position of the shield 232 relative to the pin 454 resulting from manufacturing tolerances. The post 454 is sufficiently long so that it engages the aperture 454 even when the shield 232 is raised to its uppermost position. The arrangement illustrated in FIGS. 31 and 32 has the advantage that it provides more accurate alignment of the arm 226 over the playing mechanism 220 because the post 454 is radially displaced from the center line of the shaft 261 by a relatively long distance. Thus, any variations in the position of the aperture 452 or the post 454 will result in only minor angular deviations of the arm 226. Also, the arm 226 will be less likely to wobble when registered by the post 454 than by the pin 291.

As previously discussed, the carousel 212 was registered with a different one of its receptacles in the play position over the reading mechanism 220 by the three registering blocks 234, 236 and 238. In an alternative embodiment, a registering post 456 that extends upwardly from the base of the changer is provided (FIGS. 31 and 32). The post 456 is located in the vicinity of the playing mechanism 220 and is engaged by the one of the receptacles of the carousel 212 that is positioned over the playing mechanism 220. Only a single post 456 may be provided near the playing mechanism 220 or elsewhere to engage another portion of the carousel 212, or multiple posts engaging the carousel 212 at multiple points may be provided. For example, three posts may be equidistantly spaced in the vicinity of each of the receptacles so that each of the three receptacles may be engaged when one of the receptacles is in the play position. The height of the post 456 is illustrated in FIG. 32 and is selected so that when the carousel is in its lowermost or intermediate position, the carousel 212 engages the post 456, but when the carousel 212 is raised to its highest position, the post 456 is cleared.

The heads previously described that were used to hold the discs at the play station utilized a resilient biasing member such as a spring to maintain pressure against the disc 14 while the disc 14 was being rotated for play. However, in an alternative embodiment, the retaining friction force on the disc may be exerted magnetically.

Referring to FIG. 30, there is shown a pick-up head 528 that utilizes magnetic disc retainer and is suitable for use in the robot arm embodiment of the invention. The function of the head 528 is similar to that of the head 28 (FIG. 8) and that analogous components of the two heads will be numbered with like reference numerals, except those in FIG. 30 will be primed. The head 528 utilizes a centering member 544 that has a centering projection 124' that has a conical surface 128' for centering the head 528 over a centering pin 132'. In addition, because the head 528 is shown used in conjunction with a robot arm, pins 130' that have points 131' and are resiliently retained in the head 528 by a coiled extension spring 140' are provided to engage the central aperture of a disc 14. However, a magnetic head similar to the head 528 may be used in conjunction with a carousel, and in that event, the pins 130' and the spring 140' would be eliminated, and the centering member 544 would be modified to cooperate with the centering spindle 333.

The head 528 does not utilize any resilient biasing mechanism to retain the disc 14 to the flange 138'. Rather, an annular magnet 530 is retained in a spool-like retainer 532 that has a pair or flanges 534 and 536 and a ring 538 that retain the magnet 530 within the end of the arm. In the illustrated embodiment, the ring 538 is integrally molded with the flange 534 and has a plurality of upstanding members 540 that engage apertures 542 in the flange 536 and serve to secure the annular magnet 530 between the flanges 534 and 536. The central hole in the annular magnet 530 is selected so that it can receive centering member 544 including the pins 130' without interference.

The magnetic retainer 532 containing magnet 530 is received within an aperture 142' in the shield 32', and the diameter of the aperture 142' is greater than the outside diameter of the ring 538 to permit the magnet 530 and the retainer 532 to move laterally within the aperture 142' to permit the head 528 to be centered by the pin 132'. In addition, the spacing between the flanges 534 and 536 is chosen so that neither flange will touch the shield 32' when the head is positioned at a play station. In the play station, the head will be positioned as illustrated in FIG. 30 with the surface 136' of the flange 534 being in contact with the disc 14. In such a position, the magnetic force of the magnet 530 extends through the flange 534 and the disc 14, both of which are fabricated from non-magnetic material and attracts the flange 138' which is fabricated from a material that attracts magnetism. Thus, the attractive force of the magnet 530 exerts a downward force on the flange 534 and the disc 14 and serves to retain the disc 14 frictionally on the flange 138'. In the loading and discard positions, an upper portion 546 of the centering member 544 contacts an inner surface 547 of the arm (e.g. arm 26 or arm 226) so that the downward bias of the arm is directly translated to the centering projection 124'. When the arm (e.g. 26 or 226) is raised, the flange 536 is engaged by the shield 32' to raise the head 528 when a disc is being transported.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A digital disc changer, comprising:
   a loading station having means for receiving a plurality of digital discs in a stacked relationship to form a loaded stack of discs to be played;
   a play station having means for sequentially playing discs from said stack;
   a discard station having means for receiving in a stacked relationship discs that have been played at said play station;
   means for sequentially transporting the top disc from the stack of discs to the play station and then to said discard station to thereby stack the played discs in a stack at the discard station with the last-played disc being stacked on the top of any discs present at the discard station wherein said transporting means includes means for sequentially raising to a raised position the top disc from said loaded stack of discs and transporting said disc to said play station, lowering to a lowered position said disc at said play station for play, raising to the raised position said disc from said play station after play and transporting it to the discard station and lowering and releasing said disc at said discard station, wherein said transporting means includes means for lowering said disc to an intermediate position during transport thereof between stations and means associated with each station for registering said transporting means with each associated station when said disc is in the intermediate position.

2. A digital disc changer as recited in claim 1, wherein said transporting means includes a rotatably mounted driving member having a cam member thereon that is operative to raise and lower said disc upon rotation of said driving member.

3. A digital disc changer as recited in claim 2, wherein said transporting means includes a driven member frictionally engaging said driving member, said driven member being operative to cause said transporting means to transport said disc between stations.

4. A digital disc changer as recited in claim 3, wherein said driving member is operative to rotate with respect to said driven member when said transporting means is registered at one of said stations by said registering means.

5. A digital disc changer as recited in claim 1, wherein said transporting means includes means including a rotatable cam member for raising and lowering a disc as it is transported from station to station.

6. A digital disc changer, comprising:
   means at a play position for playing back information recorded on a digital disc; and
   means for transporting a disc from a first position to the play position and then to a second position, said transporting means including means for sequentially lifting the disc from said first position, transporting the disc to the play position, lowering the disc at the play position, lifting the disc from the play position, transporting the disc to the second position and lowering the disc at the second position; wherein said transporting means includes a carousel and wherein said transporting means is operative to raise and lower said carousel to thereby raise and lower said disc.

7. A digital disc changer for sequentially playing a plurality of digital discs, comprising:
   a loading station having means for receiving a plurality of digital discs in a stacked relationship to form a stack of discs to be played;
   a play station having means for sequentially receiving and playing discs from said stack;
   a discard station having means for receiving discs from said play station; and
   means including a robot arm for lifting a disc from the top of said stack, transporting the disc to the play station and lowering it at the play station for play, lifting the disc from the play station after play, transporting the disc to the discard station and releasing the disc at the discard station and wherein each of said digital discs has a central aperture and wherein said robot arm includes means for engaging said aperture for lifting and transporting said disc, wherein said robot arm is driven via a clutch having a driving member and a driven member frictionally engaging said driving member wherein said driving member includes means for raising and lowering said robot arm upon rotation of said driving member.

8. A digital disc changer as recited in claim 7, wherein said robot arm moves in a circular motion and has an axis of rotation disposed equidistant from said loading station, said play station and said discard station.

9. A digital disc changer as recited in claim 7, wherein said raising and lowering means includes a cam.

10. A digital disc changer as recited in claim 7, wherein said driven member is mechanically coupled to said robot arm and is operative to move the robot arm.

11. A digital disc changer as recited in claim 10, wherein said driving member makes a single complete revolution each time a disc is transported between two adjacent stations.

12. A digital disc changer as recited in claim 11, wherein a disc is moved from the play station to the discard station and another disc is moved from the loading station to the play station during a changing cycle, and wherein said driven member is rotated a single complete revolution during the changing cycle.

13. A digital disc changer as recited in claim 12 further including means for registering said robot arm at each of said stations.

14. A digital disc changer as recited in claim 11, wherein said robot arm is rotated a single complete revolution during a changing cycle.

15. A digital disc changer as recited in claim 14, wherein said driving member is rotated three complete revolutions during a changing cycle.

16. A digital disc changer for sequentially playing a plurality of digital discs, comprising:
   a loading station having means for receiving a plurality of digital discs in a stacked relationship to form a stack of discs to be played;
   a play station having means for sequentially receiving and playing discs from said stack;
   a discard station having means for receiving discs from said play station; and
   means including a robot arm for lifting a disc from the top of said stack, transporting the disc to the play station and lowering it at the play station for play, lifting the disc from the play station after play, transporting the disc to the discard station and releasing the disc at the discard station and wherein each of said digital discs has a central aperture and wherein said robot arm includes means for engaging said aperture for lifting and transporting said disc,
   wherein said engaging means includes one or more engaging members that frictionally engage said central aperture and are resiliently biased to exert a outwardly directed radial force against said disc;
   wherein said loading station includes an elongated stacking spindle about which discs may be stacked, said spindle being mounted for movement along its longitudinal axis and resiliently biased to an extended position wherein said spindle enters the central aperture of a disc, said spindle being movable along its longitudinal axis by said pick-up head to a retracted position out of said central aperture to permit said engaging members to engage said central aperture;
   wherein said discard station includes means for urging said engaging member or members sufficiently inwardly to disengage said central aperture and release said disc; and wherein said discard station includes a discard spindle about which discs are discarded, wherein said engaging member urging means includes a surface on said discard spindle that engages said engaging member or members to disengage said disc when said robot arm is positioned at the discard station.

17. A digital disc changer, comprising:
a loading station having means for receiving a digital disc to be played;
a play station having means playing discs from said loading station;
a discard station for receiving a digital disc played at the play station; and
transporting means for transporting digital discs from the loading station to the play station and from the play station to the discard station, the transporting means includes means for raising said disc to a raised position at said loading station and transporting the disc to the play station and lowering the disc to a lowered position at the play station, wherein said loading station, play station, and discard station are arranged in a cyclic path around a central axis and the transporting means includes driving and driven members in frictional engagement with each other to form a friction clutch and the raising and lowering means includes cam means whereby relative rotational movement between the driving and driven members is translated by the cam means into a raising and lowering of the transporting means.

18. A digital disc changer as recited in claim 17, wherein said raising, lowering and transporting means includes a robot arm.

19. A digital disc changer as recited in claim 17, wherein said raising, lowering and transporting means includes a carousel.

20. A digital disc changer as recited in claim 17, wherein said changer includes said discard station and wherein said raising, lowering and transporting means includes means for transporting said disc from said play station to said discard station.

21. A digital disc changer, comprising:
means for playing a digital disc;
a carousel having a plurality of radially spaced receptacles for receiving a plurality of digital discs; and
means for raising, rotating and lowering said carousel to raise each of said discs, sequentially transport them to said playing means and lower them over said playing means for play thereby, and to raise them from said playing means after play and transport them away from said playing means.

22. A digital disc changer as recited in claim 21 further including means positioned over said disc for retaining the disc being played over the playing means.

23. A digital disc changer as recited in claim 22, wherein said retaining means includes means for magnetically retaining disc.

24. A digital disc changer as recited in claim 22, wherein said retaining means includes a rotatable head for resiliently retaining said disc.

25. A digital disc changer as recited in claim 22 further including means for raising said retaining means in unison with said carousel.

26. A digital disc changer as recited in claim 22 further including means for lowering said retaining means in unison with said carousel.

27. A digital disc changer as recited in claim 22, wherein said carousel raising means includes a rotatable cam member.

28. A digital disc changer as recited in claim 22, wherein said carousel raising and lowering means includes means for lowering said carousel to an intermediate position during rotation thereof and means associated with said playing means for registering one of said discs with said playing means when said carousel is in the intermediate position.

29. A digital disc changer as recited in claim 28, wherein said carousel raising means includes a rotatably mounted driving member having a cam member thereon that is operative to raise and lower said carousel upon rotation of said driving member.

30. A digital disc changer as recited in claim 28, wherein said transporting means includes a driven member frictionally engaging said driving member, said driven member being operative to cause said carousel to rotate.

31. A digital disc changer as recited in claim 30, wherein said driven member is said carousel.

32. A digital disc changer as recited in claim 30, wherein said driving member is operative to rotate with respect to said driven member when said carousel means is registered by said registering means.

33. A digital disc changer as recited in claim 30, wherein there is slippage between said driven member and said driving member when said driving member is driven while said carousel is registered.

34. A digital disc changer as recited in claim 21 further including means for registering said carousel at said playing means.

35. A digital disc changer as recited in claim 21, wherein said carousel is driven via a clutch having a driving member and a driven member frictionally engaging said driving member wherein said driving member includes means for raising and lowering said carousel upon rotation of said driving member.

36. A digital disc changer as recited in claim 35, wherein said raising and lowering means includes a cam.

37. A digital disc changer as recited in claim 35, wherein said driven member is mechanically coupled to said carousel and is operative to rotate the carousel about its axis of rotation.

38. A digital disc changer as recited in claim 37, wherein said driving member makes a single complete revolution each time a disc is transported to said playing means.

39. A digital disc changer, comprising:
a play station having means for reading information recorded on a digital disc;
a loading station; and
a transport mechanism having means for lifting a disc at the loading station, transporting it to the play station by rotating the disc about an axis and lowering the disc at the play station along a path parallel to said axis and wherein said transport mechanism includes a carousel.

40. A digital disc changer as recited in claim 39, wherein said transport mechanism includes a rotatable cam.

41. A digital disc player, comprising:
means at a loading position for receiving a plurality of discs in a stacked relationship;
a play position;

transporting means including a robot arm provided with means for engaging a top one of said discs at the loading position, transporting the disc to the play position, centering and rotatably retaining the disc in a centered relationship at the play position; and wherein said transporting means includes a cam and clutch assembly for rotating said robot arm between said loading and play positions.

42. A digital disc changer as recited in claim 41, wherein said centering and retaining means includes means for resiliently retaining said disc.

43. A digital disc changer as recited in claim 41, wherein said centering and retaining means includes means for magnetically retaining said disc.

44. A digital disc reader or writer comprising:
means for rotating at a reading or writing position an individual disc capable of containing digital information;
means at a loading station for receiving a plurality of discs in a stacked relationship; and
means for engaging a top one of said discs at said loading station at or near the center thereof and transporting said disc to said reading or writing position for rotation by said rotation means, said engaging means being operative to center and retain said disc for rotation at said reading or writing position and said engaging means rotating with said disc; and wherein said transporting means includes a robot arm.

45. A digital disc reader or writer comprising:
means for rotating at a reading or writing position an individual disc capable of containing digital information;
means at a loading station for receiving a disc to be read or written; and
transporting means including a robot arm provided with means for engaging a disc at said loading station at or near the center thereof and transporting said disc to said reading or writing position for rotation by said rotating means, said engaging means being operative to center and retain said disc for rotation at said reading or writing position and said engaging means rotating with said disc; and wherein said robot arm is driven from said loading station to said reading or writing position and said transporting means includes cam member to raise and lower said robot arm.

46. A digital disc changer as recited in claim 45, wherein said centering and retaining means includes means for resiliently retaining said disc.

47. A digital disc changer as recited in claim 45, wherein said centering and retaining means includes means for magnetically retaining said disc.

48. A digital disc changer comprising:
a play station having means for reading information recorded on a digital disc;
a loading station; and
a transport mechanism having means for lifting a disc at the loading station, transporting it to the play station by rotating the disc about an axis and lowering the disc at the play station along a path parallel to said axis, wherein said transport mechanism includes a carousel.

49. A digital disc changer comprising:
a loading station having means for receiving a digital disc to be played;
a play station having means for reading information recorded on a digital disc;
a discard station for receiving a digital disc from the play station; and
transporting means for transporting a digital disc from the loading station to the play station and from the play station to the discard station, the transporting means including means for raising said disc to a raised position at said loading station and transporting the disc to the play station and lowering the disc to a lowered position at the play station and means for lowering said disc from said raised position to an intermediate position during transport thereof between stations and means associated with each station for registering said transporting means with each associated station when said disc is in the intermediate position.

50. A digital disc changer as recited in claim 49 wherein said transporting means includes a robot arm.

51. A digital disc changer as recited in claim 49 wherein said transporting means includes a carousel.

52. A digital disc changer comprising:
means at a play position for playing back information recorded on a digital disc; and
means for transporting a disc from a first position to the play position and then to a second position, said transporting means including means for sequentially lifting the disc from said first position, transporting the disc to the play position, lowering the disc at the play position, lifting the disc from the play position, transporting the disc to the second position and lowering the disc at the second position, wherein said transport mechanism includes a carousel.

53. A digital disc changer as recited in claim 52 wherein said transporting means includes driving and driven members in engagement with each other to form a clutch and the raising and lowering means includes cam means whereby relative movement between the driving and driven members is translated by the cam means into a raising and lowering of the transporting means.

54. A digital disc changer as recited in claim 52 wherein said transporting means includes a rotatable cam.

* * * * *

UNITED STATES PATENT AND TRADEMARK OFFICE
CERTIFICATE OF CORRECTION

PATENT NO. : 5,291,465
DATED : March 1, 1994
INVENTOR(S) : James T. Dennis It is certified that error appears in the above-identified patent and that said Letters Patent is hereby corrected as shown below:

Column 19, claim 17, line 12, after "means", --for-- should be added;

Column 20, claim 28, line 4, "22" should be changed to --21--;

Column 21, claim 42, line 9, "changer" should be changed to --player--;

Column 21, claim 43, line 12, "changer" should be changed to --player--;

Column 21, claim 46, line 48, "changer" should be changed to --reader or writer--; and Column 21, claim 47, line 51, "changer" should be changed to --reader or writer--.

Signed and Sealed this

Sixteenth Day of August, 1994

*Attest:*

BRUCE LEHMAN

*Attesting Officer*    Commissioner of Patents and Trademarks